United States Patent
Mohan

(10) Patent No.: US 8,045,475 B2
(45) Date of Patent: *Oct. 25, 2011

(54) METHOD AND APPARATUS FOR PROVIDING AVAILABILITY METRICS FOR MEASUREMENT AND MANAGEMENT OF ETHERNET SERVICES

(75) Inventor: Dinesh Mohan, Kanata (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1427 days.

This patent is subject to a terminal disclaimer.

(21) Appl. No.: 11/304,019

(22) Filed: Dec. 15, 2005

(65) Prior Publication Data

US 2006/0092847 A1    May 4, 2006

Related U.S. Application Data

(63) Continuation-in-part of application No. 10/881,296, filed on Jun. 30, 2004.

(60) Provisional application No. 60/518,910, filed on Nov. 10, 2003, provisional application No. 60/518,920, filed on Nov. 10, 2003, provisional application No. 60/518,919, filed on Nov. 10, 2003, provisional application No. 60/518,912, filed on Nov. 10, 2003, provisional application No. 60/535,018, filed on Jan. 7, 2004.

(51) Int. Cl.
*H04J 1/16* (2006.01)
(52) U.S. Cl. ........................................ 370/241
(58) Field of Classification Search .................. 370/241, 370/241.1, 338, 331, 332, 333, 334, 252, 370/400, 401, 231, 232, 234, 235, 236.2, 370/229, 351; 709/223, 224; 702/177; 379/265.06
See application file for complete search history.

(56) References Cited

U.S. PATENT DOCUMENTS

| | | | |
|---|---|---|---|
| 6,614,763 B1 | 9/2003 | Kikuchi et al. | |
| 6,681,232 B1 | 1/2004 | Sistanizadeh et al. | |
| 6,704,289 B1 * | 3/2004 | D'Souza et al. | 370/252 |
| 6,831,890 B1 * | 12/2004 | Davis et al. | 370/229 |
| 6,865,602 B1 * | 3/2005 | Nijemcevic et al. | 709/223 |
| 7,012,933 B2 * | 3/2006 | Mark et al. | 370/487 |
| 7,050,931 B2 * | 5/2006 | Conrad | 702/177 |
| 7,177,325 B2 * | 2/2007 | Claseman | 370/469 |
| 7,257,640 B1 * | 8/2007 | Callocchia et al. | 709/233 |
| 7,386,467 B2 * | 6/2008 | Eitel et al. | 705/11 |
| 2005/0099952 A1 * | 5/2005 | Mohan et al. | 370/241 |

OTHER PUBLICATIONS

McFarland et al.: Ethernet OAM: Key Enabler for Carrier Class Metro Ethernet Services, Communications Magazine, IEEE, Publication Date: Nov. 2005, vol. 43, Issue: 11, pp. 152-157, ISSN: 0163-6804.

Metro Ethernet Forum, Technical Specification MEF 3, Circuit Emulation Service Definitions, Framework and Requirements in Metro Ethernet Networks, Apr. 13, 2004. http://www.metroethernetforum.org/PDFs/Standards/MEF3.pdf.

* cited by examiner

*Primary Examiner* — Chi Pham
*Assistant Examiner* — Alexander Boakye
(74) *Attorney, Agent, or Firm* — Christopher & Weisberg, P.A.

(57) ABSTRACT

Maintenance entities may be defined between customer and provider flow points to allow performance management to take place on an Ethernet network. The maintenance entities may be defined for access link, intra-domain, and inter-domain, and may be defined on a link or service basis. Performance parameters, including availability metrics, may be collected for the maintenance entities. The provision of such availability metrics in an Ethernet based solution to facilitate consistency of service management and operations for carriers transitioning to the Ethernet solution.

18 Claims, 7 Drawing Sheets

METHOD AND APPARATUS FOR PROVIDING AVAILABILITY METRICS FOR MEASUREMENT AND MANAGEMENT OF ETHERNET SERVICES

CROSS REFERENCE TO RELATED APPLICATIONS

This application claims priority under 35 U.S.C. §1.120 as a continuation-in-part of patent application Ser. No. 10/881,296, filed Jun. 30, 2004 by Mohan et al. and entitled "Ethernet OAM Performance Management", (referred to hereinafter as "Mohan") which claims the benefit of and priority from the following five Provisional U.S. Patent Applications 60/518,910, filed Nov. 10, 2003, entitled "Proposal for OAM Domain," 60/518,920, filed Nov. 10, 2003, entitled "Proposal For Connectivity Check Function For Fault Management In Ethernet OAM," 60/518,919, filed Nov. 10, 2003, entitled "Proposal For Non-Intrusive Loopback For Fault Management In Ethernet OAM," 60/518,912, filed Nov. 10, 2003, entitled "Proposal For Path Trace Function For Fault Management In Ethernet Networks," and 60/535,018, filed Jan. 7, 2004, entitled "Ethernet OAM: Performance Management." The content of each of these six applications is hereby incorporated herein by reference.

BACKGROUND OF THE INVENTION

1. Field of the Invention

The present invention relates to communication networks and, more particularly, to a method and apparatus for providing availability metrics for use in managing Ethernet Services.

2. Description of the Related Art

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements.

Ethernet is a well known networking protocol that has been defined by the Institute of Electrical and Electronics Engineers (IEEE) as standard 802. Conventionally, Ethernet has been used to implement networks in enterprises such as businesses and campuses, and other technologies have been used to transport network traffic over longer distances. Specifically, network providers such as carriers were reluctant to deploy networks based on Ethernet technology, since Ethernet is designed to provide best efforts service and doesn't support Operation, Administration, and Maintenance (OAM) functions desired by the network providers. Since network providers need to be able to guarantee connectivity, Ethernet was felt to be inappropriate for deployment in these types of networks. When two Ethernet networks were to be connected over a network provider's network, the Ethernet frames would be converted to protocol data units using a transport protocol such as ATM, and carried over the network using the carrier's transport protocol. The Ethernet frames would then be recovered at the other side of the network provider's network and passed onto the second Ethernet network.

As the underlying networks have evolved and more and more Ethernet networks are being connected together, it has become more desirable to transport Ethernet frames in native form over the network provider's networks. Unfortunately, although it may be possible to overcome the limitations associated with the best-efforts nature of the Ethernet technology, other aspects of the Ethernet protocol still remain to be solved. For example, Ethernet does not enable certain Operation, Administration, and Maintenance (OAM) operations to take place to manage and diagnose problems on the network. Accordingly, it is difficult to determine whether the Ethernet networks satisfy the recommended availability objectives for constant bit-rate digital links specified in ITU G.827, or the end-to-end performance objectives set forth in ITU G.826. It would be desirable to identify a method and apparatus for collecting performance parameters that can be used to determine whether the network is standard compliant.

SUMMARY OF THE INVENTION

According to one aspect of the invention, a method and apparatus of generating availability metrics for use in connection management in an Ethernet network is provided. The method includes the steps of defining thresholds for measured performance parameters, monitoring the performance of maintenance entities to obtain measured performance parameters for connections in the network, and calculating availability metrics in response to the measured performance parameters and defined thresholds.

Maintenance entities may be defined between any two flow points on the network, for example between customer flow points, provider flow points, or both, and may include, for example, access link, intra-domain, and inter-domain maintenance entities. The maintenance entities may be defined on a link basis or service basis, and may be used to measure performance of various aspects of the Ethernet network.

Maintenance entities may be used to monitor performance and measure frame metrics such as Frame Loss Ratio (FLR), Frame Delay (FD) and Frame Delay Variation (FDV) over network connections. According to one aspect of the invention, thresholds are defined for each of the FLR, FD and FDV metrics, and the threshold information is used in combination with the measured frame metrics to provide a variety of availability metrics including but not limited to Errored Seconds, Severely Errored Seconds, Unavailable Seconds, Unavailable Time, Available Time, Errored Second Ratio, Severely Errored Second Ratio, Availability Ratio, Unavailability Ratio and Outage Intensity. Such availability metrics can be used to monitor the service level of each connection, to identify connection performance degrade and the severity of performance degrade in an Ethernet network, similar to the operation of availability metrics described in G.826 and G.827 for SDH and PDH networks.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

The present invention supplements previously filed patent application Ser. No. 10/881,296, filed May 21, 2005 by Mohan et al. and entitled "Ethernet OAM Performance Management", (referred to hereinafter as "Mohan"), incorporated above by reference. In particular, the present invention provides a method and apparatus whereby connection availability metrics can be used in the Ethernet network described in Mohan to enable Carriers, who have such availability information available to them for other technologies (SONET, SDH, OTN, etc.) to migrate towards Ethernet based services.

The International Telecommunication Union (ITU) is an international organization that sets communications standards for global telecom networks. Carriers build networks according to the standards put forth by the ITU, IEEE, and other standard organizatioins. One sector of the ITU, the ITU Telecommunication Standardization Sector (ITU-T), coordinates standards for telecommunications on behalf of the International Telecommunication Union (ITU). For example, ITU G.806 specifies the methodology, generic functionality, and components that should be used in order to specify transport network functionality of network elements. G.826 defines error performance parameters and objectives for international digital paths which operate at or above the primary rate. G.827 defines network performance parameters, objectives, and measurement methods for describing availability performance. Performance objectives are specified for any service or network facility in a transmission path.

The present invention provides a method and apparatus for determining the availability metrics specified by the ITU standards using the Ethernet network of Mohan. In particular, according to one aspect of the invention, measured performance parameters are compared against supplied thresholds to generate the availability metrics. A review of the Ethernet OAM Network of Mohan is provided in Section I below, followed by a description of how the performance parameter information is retrieved and used to generate availability metrics in Section II.

Section I: Ethernet OAM Network

Figure 1:
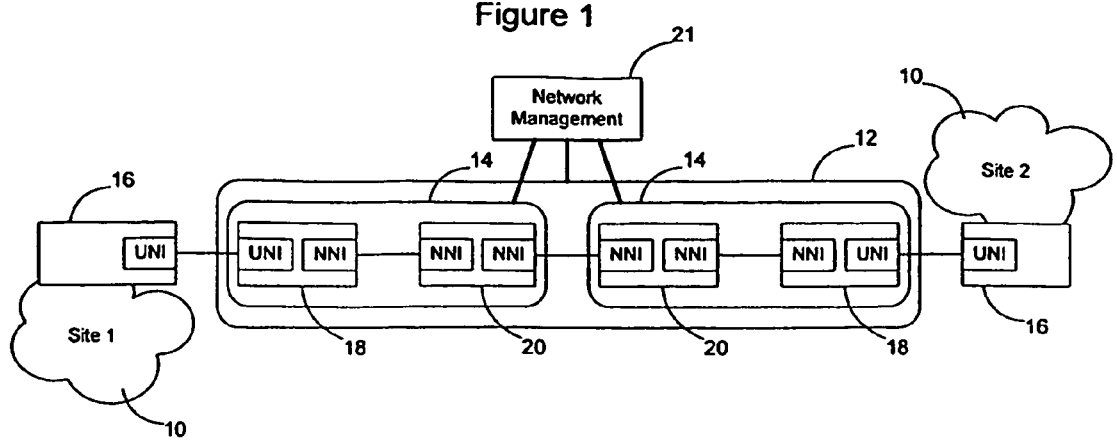
FIG. 1 is a functional block diagram of communication network.

FIG. 1 illustrates an example of a network topology in which customer sites 10 running a conventional protocol such as Ethernet are interconnected over a network 12. Multiple carriers 14 may participate in handling data flowing between the sites over the network, and each of the carrier networks may have multiple domains. Each customer site 10 is connected to the provider's 12 using a Customer Edge (CE) network element 16. Network elements within the provider's network that interface CE network elements will be referred to herein as Provider Edge (PE) network elements 18, and network elements within the provider's network that only interface other provider network elements and do not interface CE network elements will be referred to as Provider (P) network elements 20.

Interfaces on P, PE, and CE network elements may be configured to implement a protocol such as User to Network Interface (UNI), Network to Network Interface (NNI) or another protocol. These interfaces may serve as reference points in the network and can be managed using OAM flows.

Network management may be handled centrally, via one or more network management stations 21, or may be done on the network elements in a distributed fashion. In the embodiment illustrated in FIG. 1, a network management station 21 interfaces with the networks 10, 12, 14, to enable OAM operations to take place on the networks. Each network 10, 12, 14, may have its own network management station or they may connect to a common management station. The network management station may be connected to all network elements within a domain/network, or may be connected to select network elements, for example the edge network elements (PEs) 18. The invention is not limited to the embodiment illustrated in FIG. 1.

Figure 2:
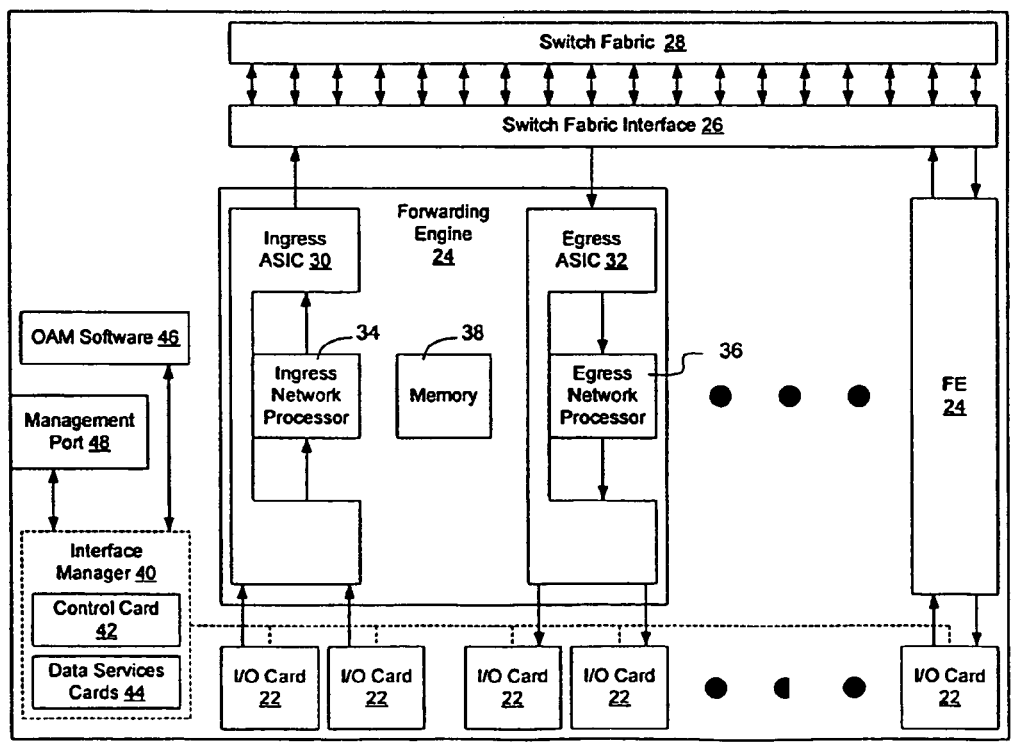
FIG. 2 is a functional block diagram of a network element according to an embodiment of the invention.

FIG. 2 illustrates one embodiment of a network element that may be configured to implement an embodiment of the invention. The network element may be used to implement one of the CE 16, PE 18, or P 20 network elements of FIG. 1. The invention is not limited to a network element configured as illustrated, however, as the invention may be implemented on a network element configured in many different ways. The discussion of the specific structure and methods of operation of the embodiment illustrated in FIG. 2 is intended only to provide one example of how the invention may be used and implemented in a particular instance. The invention more broadly may be used in connection with any network element configured to handle Ethernet frames in a communications network.

As shown in FIG. 2, the network element generally includes Input/Output (I/O) cards 22 configured to connect to links in the communications network. The I/O cards 22 may include physical interfaces, such as optical ports, electrical ports, wireless ports, infrared ports, or ports configured to communicate with other conventional physical media, as well as configurable logical elements capable of operating as MAC (layer 2) ports under the direction of an interface manager, described in greater detail below.

One or more forwarding engines 24 are provided in the network element to process frames received over the I/O cards 22. The forwarding engines 24 forward frames to a switch fabric interface 26, which passes the packets to a switch fabric 28. The switch fabric 28 enables a frame entering on a port on one or more I/O cards 22 to be output at one or more different ports in a conventional manner. A frame returning from the switch fabric 28 is received by one of the forwarding engines 24 and passed to one or more I/O cards 22. The frame may be handled by the same forwarding engine 24 on both the ingress and egress paths. Optionally, where more than one forwarding engine 24 is included in the network element 20, a given frame may be handled by different forwarding engines on the ingress and egress paths. The invention is not limited to any particular forwarding engine 24, switch fabric interface 26, or switch fabric 28, but rather may be implemented in any suitable network element configured to handle Ethernet frames on a network. One or more Application Specific Integrated Circuits (ASICs) 30, 32 and processors 34, 36 may be provided to implement instructions and processes on the forwarding engines 24. Optionally, a memory 38 may be included to store data and instructions for use by the forwarding engines.

An interface management system 40, optionally containing one or more control cards 42 and one or more data service cards 44, may be provided to create and manage interfaces on the network element. The interface management system may interact with an OAM module 46 locally instantiated on the network element or interfaced to the network element over a management interface port 48. The OAM module 46 may be implemented in software, firmware, hardware, or in any other manner as discussed in greater detail here.

As discussed in greater detail below, Ethernet OAM may allow network level OAM functions to be supported on the network, and may also allow service level Ethernet OAM functions to be supported on the network element. The following description will contain several sections. First a notion of Ethernet OAM domains will be introduced, and an OAM frame format will be introduced to support OAM operations within the domain (intra-domain) and between domains (inter-domain). Then the use of Ethernet OAM frames for monitoring performance for intra-domain and inter-domain flows to obtain performance parameters will be described.

Ethernet OAM Domains

Ethernet OAM domains and OAM flow identifiers are described in greater detail in Provisional U.S. patent application Ser. No. 60/518,910, filed Nov. 10, 2003, the content of which is hereby incorporated by reference. As discussed in greater detail below, OAM domains and OAM flow identifiers may be used to perform OAM functions in Ethernet domains by enabling network elements within the domains to filter OAM frames based on OAM domain and OAM flow identifier.

To enable network providers to use Ethernet technology in their carrier networks, Ethernet OAM should be able to operate within a domain (such as within a provider's domain), between domains (such as between domains owned by one provider or between domains owned by multiple providers), and should be able to take place in a point-to-point, a point-to-multipoint, a multipoint to point, or a multipoint to multipoint manner. The reason for these requirements, is that a given service for a subscriber may cross multiple domains owned and operated by multiple different parties. For example, a subscriber may have one office in a first city and another office in another city. The metropolitan carrier in each city may be different, and a third carrier may provide the long haul connectivity between the metropolitan areas. If Ethernet technology is to be used to support the transmissions end-to-end across the multiple carriers, OAM will need to be implemented within each domain and between domains.

Network elements placed at an administrative boundary of a provider's network serve as edge network elements for that provider network and handle the ingress and egress of network flows to/from the provider network. When an edge network element performs a hand-off of an Ethernet layer flow, to an edge network element of another provider, that network element serves as an edge hand-off network element. Not all edge network elements are edge hand-off network elements, as some edge network elements will not interface with other provider edge network elements. Those network elements that are not associated with the ingress, egress or hand-offs of network flows serve as interior network elements.

Additional administrative boundaries may exist within a single provider network to separate the provider network into domains. Network elements within the domain may similarly be classified as edge, edge hand-off, and interior network elements within each such administrative boundary.

OAM flows can be inserted and extracted at reference points within the network, namely at flow points and termination flow points. According to an embodiment of the invention, the following OAM flows may be defined:

Customer UNI-UNI flow between reference points on the customer side of the UNI.

Provider UNI-UNI flow between reference points on the provider side of the UNI

Segment OAM flows:

Between flow points on the boundary of a provider network;

Between flow points on the boundaries of two adjacent provider networks; and

Between any flow points as required;

Ethernet Physical Layer (ETY) link OAM flows.

Other OAM flows may be identified as well and the invention is not limited to the particular identified OAM flows.

Depending on the type of OAM flow, a provider may seek to limit the flow to maintain it within its administrative boundary. For example, the provider may wish to create segment OAM flows between flow points on a domain boundary that are not allowed to reach a customer network or another provider's network. Similarly, the network providers may wish to create segment OAM flows between flow points on boundaries of their provider networks that are not allowed to reach a customer's network or another provider's network. Therefore, an OAM service may be carried across a single or multiple OAM domains.

Ports on a network element in an OAM domain can be classified as interior or exterior to a particular OAM domain. Interior ports are those on which OAM frames, belonging to an OAM flow, are recognized and processed. Processing may result in either termination of the OAM flow or transmission of the OAM flow from one or more other ports on the network element. Ports not interior to a domain are exterior ports. An edge network element has both interior and exterior ports to an OAM domain, while an interior network element has all its ports marked as interior ports to that OAM domain.

Within an OAM domain, OAM flows may be applicable between edge network elements only (an edge hand-off network element is also an edge network element) or across all network elements (i.e. including all interior network elements and edge network elements).

OAM frames can be unicast or multicast frames. The difference between the two is based on the destination MAC address (DA). A unicast OAM frame has a unicast DA while a multicast OAM frame has the multicast bit set in the frame DA and thus has a multicast DA. A multicast OAM frame can associate itself to all edge networks elements or all network elements inside a domain, based on its multicast DA. According to an embodiment of the invention, the network elements support two types of OAM multicast DAs: all edge bridges multicast DA; and all bridges multicast DA. Other multicast DAs may be used as well, and the invention is not limited to an embodiment that supports only these two types of multicast DAs.

Different OAM flows can be identified by using OAM flow identifiers within the OAM frames. OAM flow identifiers can assume many values. Several examples of which are set forth below. The invention is not limited to these values, however:

$UNI\text{-}UNI_{Customer}$—a Customer UNI-UNI flow between reference points on the customer side of the UNI;

$UNI\text{-}UNI_{Provider}$—a Provider UNI-UNI flow between reference points on the provider side of the UNI;

$Segment_{intra\text{-}provider}$—a Segment OAM flow between flow points within the boundary of a provider network. This may include an OAM flow between flow points on the boundary of a provider network or between any flow points within a provider network as required.

$Segment_{inter\text{-}provider}$—a segment OAM flow between flow points inside the boundaries of two or more provider networks. This may include an OAM flow between flow points on the boundaries of two or more adjacent provider networks or between any flow points inside the boundaries of two or more provider networks, as required. Under special cases, the flow identifier $Segment_{inter\text{-}provider}$ may operate the same as the flow identifier $UNI\text{-}UNI_{Provider}$.

$UNI_{Segment}$—an OAM flow between reference points (i.e. Termination Flow Point (TFP and Flow Point (FP)) on the customer side and provider side of the UNI.

$NNI_{Segment}$—an OAM flow between flow points on two edge hand-off network elements connected to each other. Each edge hand-off network element belongs to a different provider network.

$UNI_{Link}$—If the UNI is realized using a single Ethernet Physical Layer (ETY) link, this OAM flow can be used for the ETY link between customer and provider networks.

$Transit_{Link}$—this OAM flow can be used for any intermediate ETY link between network elements.

Of these flow identifiers, $UNI_{Link}$ and $Transit_{Link}$ can be based on a proposed standard being discussed in the IEEE 802.3ah. The other flow identifiers may be defined as discussed in greater detail herein. Also, although multiple different OAM flows have been identified, not all will be applicable for all services and/or business models, particularly with multiple provider scenarios. Thus, the invention is not limited to an embodiment that supports all of these particular or only these particular listed flow identifiers.

A combination of the two types of OAM Multicast DA and the OAM Flow identifiers, as discussed above, can allow OAM flows to be created for multiple different maintenance entities. By filtering based on OAM flow identifiers, edge network elements can protect the domain from external sources of OAM frames, and ensure that OAM frames do not leak outside the domain.

Figure 3:
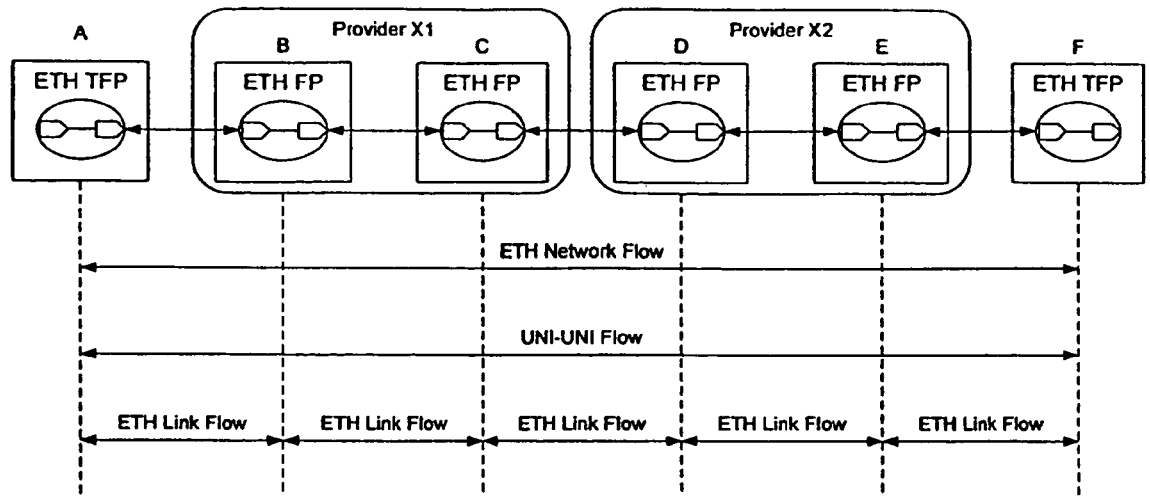
FIG. 3 is a functional block diagram illustrating flows on a network such as the communication network of FIG. 1.

FIG. 3 illustrates an example of a point-to-point flow reference model for an Ethernet layer network. In FIG. 3, network elements A and F are customer network elements, network elements B and C are edge network elements of provider X1 and network elements D and E are edge network element of provider X2. Network elements C and D are also edge hand-off network elements since they hand-off Ethernet OAM flows between the X1 and X2 domains. It will be assumed for the purposes of this example that there are other edge and interior network element in both provider X1 and provider X2 networks.

A provider UNI-UNI OAM flow can be generated at B (with a Unicast DA=MAC address on E) with OAM flow identifier (identifier=$UNI\text{-}UNI_{Provider}$). This OAM frame gets forwarded to E based on its Unicast DA.

When a similar provider UNI-UNI Multicast OAM flow is needed, it can be generated at B (with a multicast DA=all edge bridges multicast DA) with OAM flow identifier (identifier=$UNI\text{-}UNI_{Provider}$). As a result, all edge network elements within provider X1 OAM domain receive this OAM frame. When C receives this OAM frame, it recognizes it and processes it, as C is an edge network element. Since the OAM flow identifier=$UNI\text{-}UNI_{Provider}$, C also forwards the OAM frame to D. When D receives this frame, it recognizes it and processes it. D also forwards this frame to all other edge network elements within provider X2 OAM domain. When this OAM frame reaches E, it recognizes it and processes it. However, since the OAM frame is not meant to be sent to the customer network, E terminates the OAM frame.

If a segment multicast OAM flow is needed within the edge devices of provider X1 network, it can be generated at B (with a multicast DA=all edge bridges multicast DA) with OAM flow identifier (identifier=$Segment_{intra\text{-}provider}$). As a result, all edge network elements within provider X1 OAM domain will receive this OAM frame. When C receives this OAM frame, it recognizes it and processes it, since C is an edge network element. Since identifier=$Segment_{intra\text{-}provider}$, C will terminate the OAM frame and will not forward the OAM frame to D.

If a segment multicast OAM flow is needed across all devices of provider X1 network, it can be generated at B (with a multicast DA=all bridges multicast DA) with OAM flow identifier (identifier=$Segment_{intra\text{-}provider}$). As a result, all network elements within provider X1 OAM domain receive this OAM frame. When C receives this OAM frame, it recognizes it and processes it. Since identifier=$Segment_{intra\text{-}provider}$, C terminates the OAM frame and does not forwards the OAM frame to D.

According to an embodiment of the invention, the value of the flow identifier may be compared using a simple algebraic comparison with a reference to determine whether the OAM frame should be passed or dropped. For example, in one embodiment, the value of the OAM flow identifiers can be set so that filtering can be done based on whether the OAM frame entering or exiting a domain has an OAM flow identifier value smaller than a minimum OAM flow identifier configured on the interior and/or exterior ports of the domain. For example, if the following octet values are assigned to OAM flow identifiers:

$UNI\text{-}UNI_{Customer}$=255 (0xFF);
$UNI\text{-}UNI_{Provider}$=253 (0xFD);
$Segment_{inter\text{-}provider}$=251 (0xFB);
$NNI_{Segment}$=249 (0xF_9);
$UNI_{Segment}$=247 (0xF7);
$Segment_{intra\text{-}provider}$=245 (0xF5);
$UNI_{Link}$=243 (0xF3); and
$Transit_{Link}$=241 (0xF1).

If the following minimum OAM flow identifier values are configured across the different ports, NNI port=249 (0xF9), UNI port=247 (0xF7), and Interior port=245 (0xF5), then filtering at edge network elements can be achieved such that OAM frames with OAM Flow identifiers smaller than the minimum OAM flow identifier are not allowed into or out of the OAM domain. The invention is not limited to this embodiment, however, as other manners of filtering may be performed as well. For example, the network elements may be configured to look for particular values or ranges of values depending on the function of the network element or port and the manner in which the OAM flow identifiers are implemented. Thus, the invention is not limited to the particular examples set forth above.

Ethernet OAM Frame Format

To enable OAM frames to be handled by network elements in an Ethernet domain and between Ethernet domains, an Ethernet OAM frame format is defined, according to one embodiment of the invention, which can be applied to all Ethernet OAM messages. Ethernet OAM can be used for both facility OAM and service OAM, in which a service OAM flow is associated with a specific service instance, and a facility OAM flow is not associated with a specific service instance.

Figure 4:
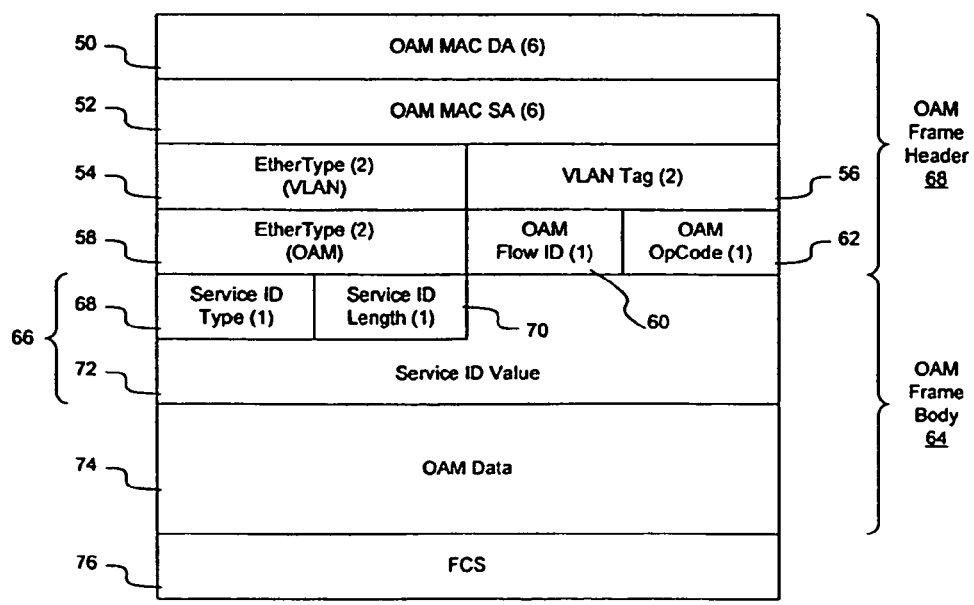
FIG. 4 is a functional block diagram of an Ethernet OAM format according to an embodiment of the invention.

Although OAM frames may be defined in a number of different ways, according to an embodiment of the invention, the OAM frame format may be arranged as illustrated in FIG. 4. The invention is not limited to this embodiment, however, as other frame formats may be used as well.

Ethernet OAM frames can be Unicast or Multicast, and this distinction is based on the frame's destination MAC address (DA). The OAM DA field 50 is a 6-Octet field that identifies the destination address of the OAM frame. The DA can be a unicast address of a specific bridge, or a multicast address corresponding to a group of bridges, such as a DA associated with an all edge bridges multicast address, or an all bridges multicast address. Other multicast addresses may be used as well. According to an embodiment of the invention, the Ethernet OAM frame format supports two types of multicast DAs: an all edge bridges multicast DA, and an all bridges multicast DA. The invention is not limited in this manner, however, as other forms of multicast DAs may be used as well.

The OAM MAC Source Address (SA) field 52 is a 6-Octet field that identifies the source address of the OAM frame. The Source Address (SA) can either be a unique address identifying the source bridge (a unique unicast MAC address assigned to the source bridge for OAM functionality) or can be the MAC address of a bridge port over which the OAM frame was sourced.

Ethernet OAM frames may be differentiated from data frames based on a pre-defined EtherType 54. The OAM EtherType may be defined in a number of ways, and the invention is not limited to a particular OAM EtherType definition. Multicast Ethernet OAM frames can also be differentiated based on either of the above two mentioned DAs.

An optional VLAN tag 56 may be used to identify a VLAN corresponding to the OAM message. When used, this VLAN tag may identify a service instance to which this OAM frame is associated, although the VLAN tag may also be used for other purposes as well.

The EtherType (VLAN) and VLAN Tag fields form a 4-octet field and are present when the OAM frame is associated with a service instance. In this case, this VLAN tag identifies the associated service instance.

The EtherType (OAM) 58 is a 2-octet field containing a unique EtherType value that identifies a frame as an OAM frame.

Different OAM flows can be identified by using an OAM Flow ID 60 within the OAM frame. The OAM Flow ID is a 1-octet field that identifies the OAM flow to which the OAM frame belongs. The OAM flow identifier is used to filter an OAM frame from entering or leaving an OAM domain. OAM flow identifiers are described in greater detail above, although the invention is not limited to these particular described flow identifiers as other flow identifiers may be used as well.

The OAM OpCode field 62 is a 1-Octet field that identifies the OAM function of the OAM frame. Several different OAM functions may be defined by the OpCode. For example, the OpCode may define OAM functions such as intrusive loopback, non-intrusive loopback, path trace, connectivity check, performance monitoring, Alarm Indicator Signals (AIS), Remote Defect Indicators (RDI), and vendor specific functions which may allow organizations to extend OAM functions in various proprietary ways. Several of these OAM functions will be discussed in greater detail below. Examples of the values that may be assigned to the OAM OpCode field include:

Intrusive Loopback Request (0x00);
Intrusive Loopback Release (0x01);
Intrusive Loopback Reply (0x02);
Non-Intrusive Loopback Request (0x03);
Non-Intrusive Loopback Reply (0x04);
Path Trace Request (0x05);
Path Trace Response (0x06);
Connectivity Check (0x07);
Performance Monitoring Request (0x08);
Performance Monitoring Reply (0x09);
Alarm Indicator Signals (AIS), (0x0A);
Remote Defect Indicators (RDI) (x0B); and
Vendor Specific (0xFF)—The vendor specific op-code is provided to allow vendors or other organizations to extend OAM functions in proprietary ways.

Other OpCode field values may be assigned as well and the invention is not limited to an embodiment using these particular described OpCode values.

The OAM frame body is associated with the corresponding OAM OpCode. Based on the information required for the corresponding OAM function, identified using the OAM OpCode, a specific format of the OAM body can be specified.

An optional Service ID 66 TLV (type 68, length 70, value 72) may be used in the body of an OAM frame, when this frame is associated with a Service OAM. Use of a Service ID TLV, in addition to the optional VLAN tag 56 in the OAM frame header 68, provides another way to identify the service, other than the VLAN tag 56. This may be used, for example, to accommodate hierarchal VLANs, enable the OAM frames to carry unique global service IDs, and to enable other functions to be implemented using the OAM frames.

Additionally, use of a service ID TLV 66, in addition to the optional VLAN tag 56 in the OAM frame header 68, enables the service ID to be the same as the optional VLAN tag in the OAM header, thus allowing validation of OAM frames. Additionally, the service ID allows the service to be differentiated in the network from other services to enable particular OAM features to be provided per-service in the network. The service ID Type-Length-Value (TLV) field is a variable length field which is optional, and is present when the OAM frame is associated with a service instance, in which case the TLV portion identifies the associated service instance. Although the service ID has been illustrated herein as a TLV field in the Ethernet OAM frame body, the invention is not limited in this manner as the service ID may take other forms and be located at other locations in the Ethernet OAM frame, such as in the frame header.

The OAM data field 74 is a variable length field that is associated with the corresponding OAM OpCode and is specified for each OAM function. Since Ethernet OAM frames will be forwarded on the network using standard Ethernet forwarding techniques, an OAM frame including an OAM data portion must result in an Ethernet frame with a valid length as set forth in the IEEE 802 Ethernet standard. Therefore, if necessary, the OAM frame may be padded with zeros or other information/data to achieve a valid minimum frame size.

The frame check sequence (FCS) field 76 is a four byte field that carries the cyclic redundancy check (CRC) bits for the frame in a conventional manner.

As discussed above, using the notion of OAM domains it is possible to specify the manner in which OAM flows are handled and propagate on the Ethernet network. The OAM frame format, described above, contains fields to enable the frame to operate within the OAM domains and allow the network elements deployed in the network to handle the OAM frames in the intended manner. Other OAM frame formats may be developed as well, and the invention is not limited to this illustrated embodiment.

Section II: Ethernet OAM Performance Management

A method and apparatus for using OAM in an Ethernet network for performance management is described in greater detail in Provisional U.S. Patent Application Ser. No. 60/535,018, filed Jan. 7, 2004, the content of which is hereby incorporated by reference.

When subscribing to an Ethernet service, measurement of service performance becomes a requirement for service providers and optionally its customers, since such measurements can be applied towards evaluating adherence to Service Level Agreements (SLA) between the provider and customer. The performance parameters that need to be measured and mechanisms used for these measurements can be discussed in terms of the maintenance entities (MEs) and information elements that need to be supported as part of the Ethernet OAM environment. According to an embodiment of the invention, a method and apparatus for defining these parameters and information elements is provided along with a method and apparatus for measuring service performance in an Ethernet network. Additionally, the use of currently available management objects for performance management across Ethernet networks is provided.

Maintenance Entities

Figure 5:
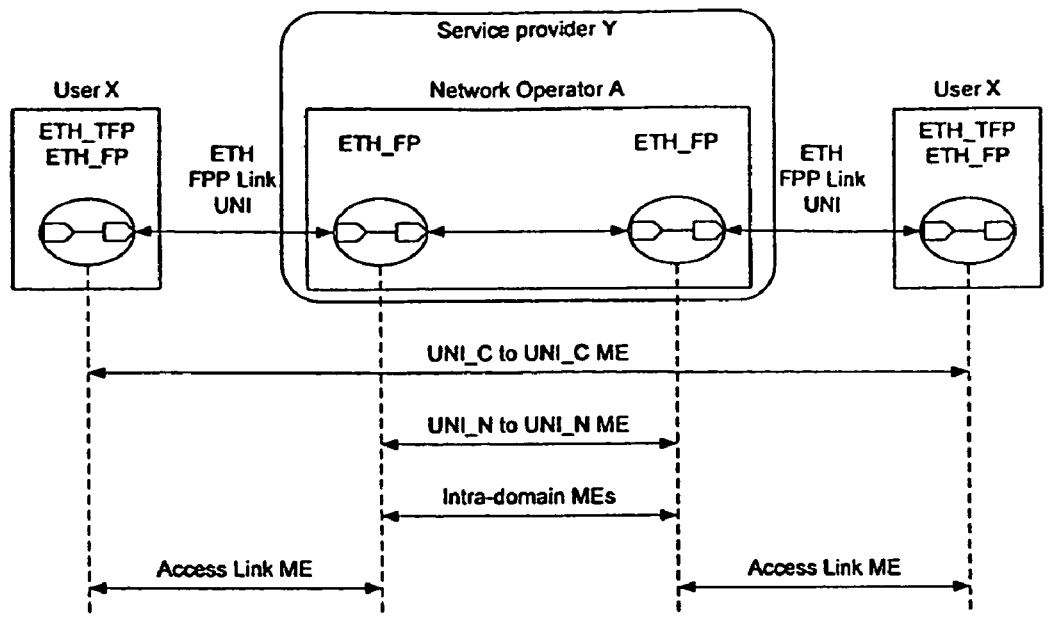
FIGS. 5 and 6 are a functional block diagrams of networks illustrating point-to-point Ethernet OAM flows according to an embodiment of the invention.
Figure 6:
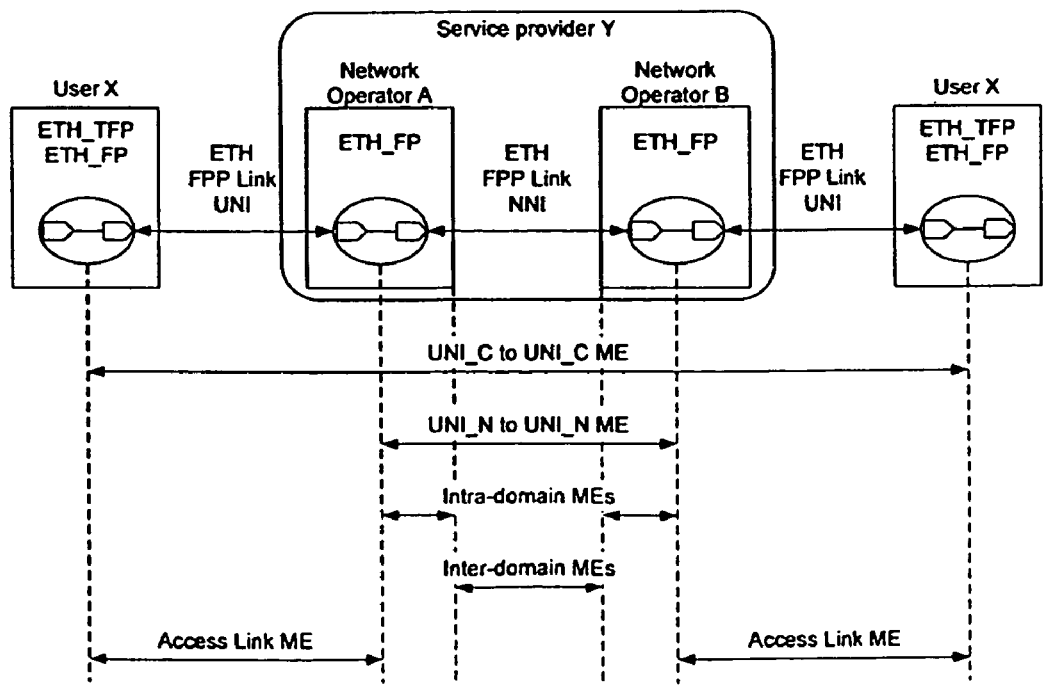
Figure 7:
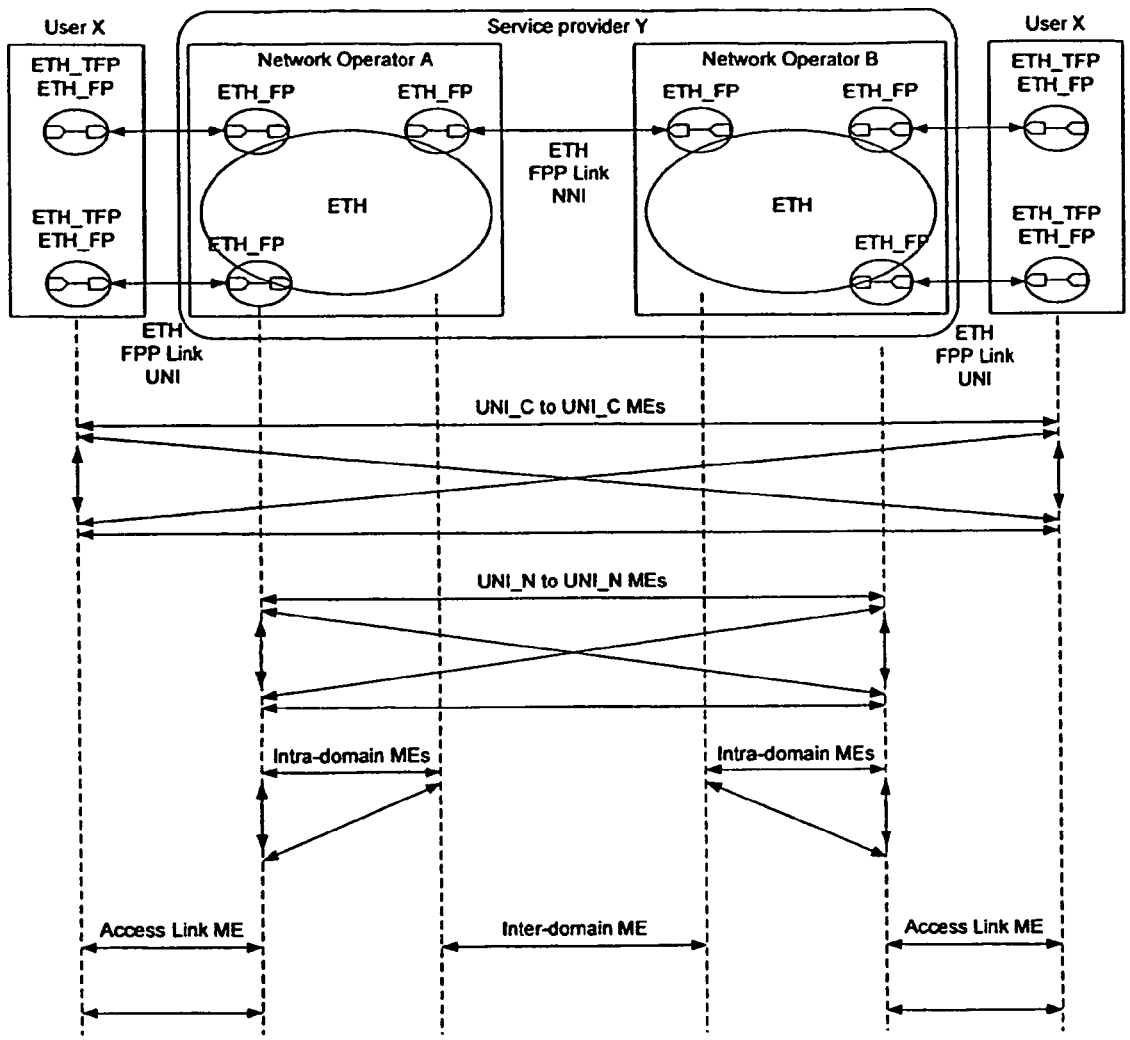
FIG. 7 is a functional block diagram of a network illustrating multi-point to multi-point, multipoint-to-point and point-to-multipoint Ethernet OAM flows according to an embodiment of the invention.
Figure 8:
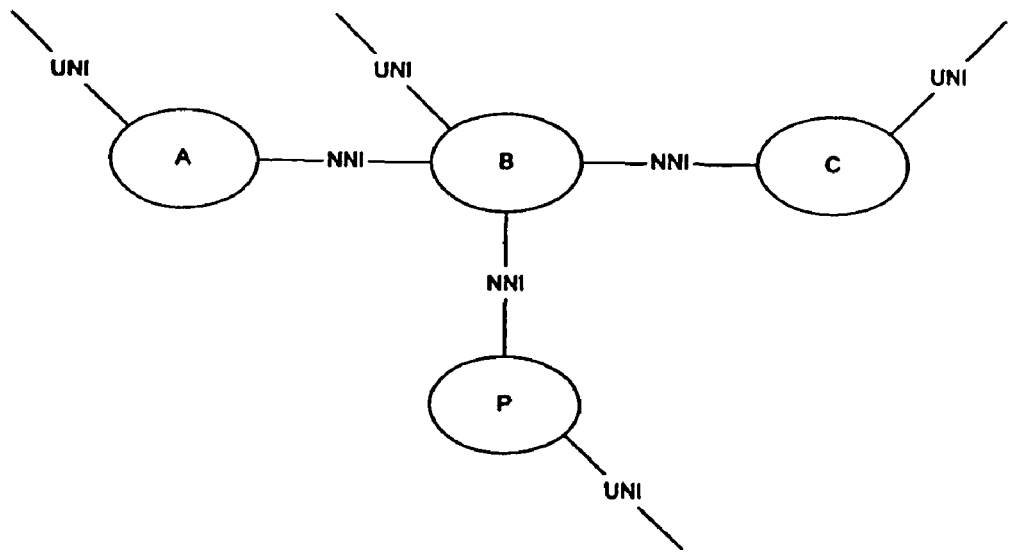
FIG. 8 is a functional block diagram of a network illustrating signaling connections between the nodes on the network.
Figure 9:
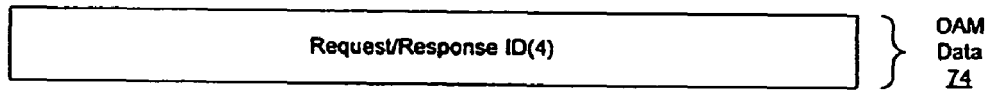
FIG. 9 is a functional block diagram of an OAM data field of a generic frame format according to an embodiment of the invention.
Figure 10:
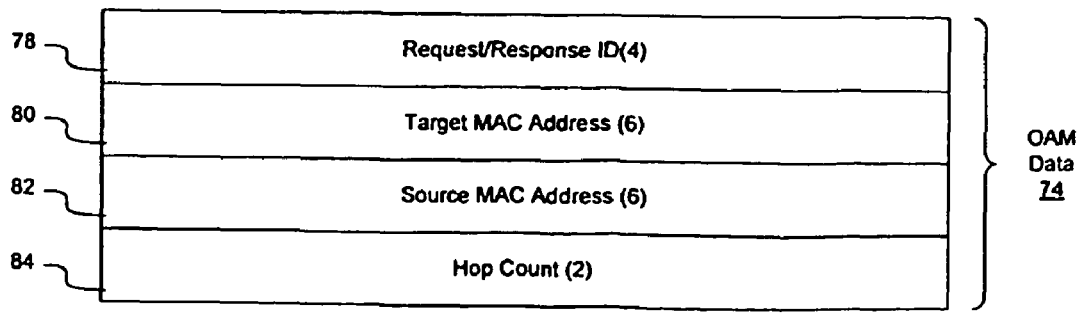
FIG. 10 is a functional block diagram of a path trace request message format according to an embodiment of the invention.

G.8010 provides point-to-point connectivity service types for both single operator and multi-operator scenarios. FIGS. 5 and 6 illustrate point-to-point Ethernet connectivity administrative domains associated with management entities, and FIG. 7 illustrates multipoint Ethernet connectivity administrative domains associated with management entities.

For point-to-point service types as illustrated in FIGS. 5 and 6, several maintenance entities are of particular interest. These maintenance entities include a maintenance entity between the customer flow points (UN_C to UNI_C), a maintenance entity between network provider flow points (UNI_N to UNI_N), access link maintenance entities, intra-domain maintenance entities, and inter-domain maintenance entities, although other maintenance entities may be created and monitored as well. When the UNI is service multiplexed across more than one service instance, performance management on a link level basis is not feasible and must be done on a service level basis.

FIG. 5 illustrates an embodiment in which a single network operator provides service to connect User X's sites across a service provider's network. FIG. 6 illustrates an embodiment in which more than one network operator provides connectivity to implement service provider Y's network. In the embodiment illustrated in FIG. 5, to monitor connectivity between user X's sites, the user can use a UNI_C to UNI_C maintenance entity. This will allow end-to-end performance monitoring across the network.

Other aspects of the connection may be monitored as well. For example, it may be desirable to monitor the access links that connect the user X's sites to the service provider. Access link maintenance entities may be used for this. It may also be desirable to monitor flows through network operator A's network to monitor the performance within the network. This many be performed, as illustrated, through the use of intra-domain maintenance entities or with an UNI_N to UNI_N maintenance entity.

Where more than one network operator is used to provide connectivity in the service provider's network, each network operator will need to monitor performance within their own network as well as allow the service provider to monitor performance across the entire network. Thus, a UNI_N to UNI_N maintenance entity may be used to monitor performance across the service provider's network, an inter-domain maintenance entity may be used to monitor performance between two network operators, and intra-domain maintenance entities may be used by each of the network operators to monitor their own networks.

When multipoint flows are to be monitored, as shown in FIG. 7, additional maintenance entities of each type may be defined. For example, where the user has multiple flow points on each site, maintenance entities may be created to monitor flows between each of the customer flow points. Similarly, an access link maintenance entity may be defined for each customer flow point, and UNI_N to UNI_N maintenance entities may be defined between each of the network flow points. Depending on the topology of the interconnectivity of the networks, a single Ethernet link NNI may be used or multiple links may be used. Multiple intra-domain maintenance entities and one or more inter-domain maintenance entities may be required as well.

All of the maintenance entities defined on the network may be used to monitor performance. The invention is not limited to the particular illustrated maintenance entities as other maintenance entities may be defined as well.

Performance Parameters

Performance parameters for Ethernet networks may include several different parameters, and the invention is not limited to measurement of any particular group of parameters. Several parameters that may be measured include frame loss, frame delay, frame delay variation, and availability. While these parameters may be defined in different ways depending on the context, several possible uses for these parameters are set forth below. The invention is not limited to these particular parameters or to the manner in which these parameters are defined, as many different parameters may be created and used to manage the Ethernet domains.

One of the parameters that may be measured is a frame loss parameter, which may be measured as the difference between the number of service frames sent to an ingress UNI and the number of service frames received at an egress UNI. This may be applied to an Ethernet Virtual Connection (EVC), which corresponds to an UNI_N to UNI_N maintenance entity. In this context, for sub-rate or virtual services, the frame loss can be associated with both in-profile and out-of-profile service frames. In-profile service frames are those that are within the Committed Information Rate (CIR) for the particular service, and out-of-profile service frames are those that are transmitted in excess of the CIR for the service. Since the network elements on the network will typically handle in-profile traffic differently than out-of-profile traffic, frame loss may be measured for both types of transmissions.

Another parameter that may be measured is the frame delay. The frame delay may be measured as a round-trip delay, which is the amount of time which elapses between transmission of the first bit of a frame by the source node and reception of the last bit of a loop backed frame by the same source node, when the loop back is performed by the frame's destination node. Other forms of delay may be measured as well, such as on-way delay, and the invention is thus not limited to measurement of round-trip delay.

Another parameter that may be measured is the frame delay variation, which may be measured as a measure of the variation in the frame arrival pattern belonging to the same class of service instances compared to the arrival pattern at the ingress of the management entity node.

The availability function is a measure of the time the maintenance entity (associating service UNIs) is in available state. It is specified as a ratio of the total time a maintenance entity is in an available state divided by the total service time, where the total service time is viewed as a number of time intervals, and the available state is viewed as an interval when the service meets the frame loss, frame delay, and frame delay variation bounds. An unavailable state is encountered when at least one of the frame loss, frame delay, and frame delay variation parameters exceed their bounds/thresholds during a time interval. These bounds/thresholds are determined by the class of service. According to one embodiment of the invention, availability metrics are provided to for use in monitoring end-to-end error and availability performance for international constant bit-rate digital data paths and connections. These performance parameters include, but are not limited to Errored Seconds (ES), Severely Errored Seconds (SES), Unavailable Seconds (UAS), Unavailable Time (UAT), Available Time (AT), Errored Second Ratio (ESR), Severely Errored Second Ratio (SESR), Availability Ratio (AR), Unavailability Ratio (AUR) and Outage Intensity (OI).

Several additional performance parameters that may be taken into consideration include service status, and frame throughput. The service status parameter indicates if the service is in-service or out-of-service. In-service or out-of-service state can be based on the available state mentioned above, and is available for both UNI-C to UNI-C and UNI-N to UNI-N maintenance entities. The frame throughput is an indication of the number of frames and/or bytes transmitted to a network interface relative to the committed information rate. Several other parameters may be measured as well, such as:

Frame Tx—the number of frames transmitted out of the customer facing interface within the (previous) time interval (e.g. 1 second).

Frame Rx—the number of frames received from the customer facing interface within the (previous) time interval (e.g. 1 second).

Frame Drop—the number of frames dropped at the customer facing interface within the (previous) time interval (e.g. 1 second).

Loopback Status—this parameter indicates whether the customer facing interface is in an intrusive loopback state (potentially due to OAM interactions across access link maintenance entity).

Client Signal Fail—this parameter indicates the state of an access link maintenance entity.

Unavailable Time—indicates the number of time intervals (e.g. 1 second) when the service status is unavailable.

Other parameters may be measured as well and the invention is not limited to these several identified measurements.

Measurement Mechanisms

There are several different measurement mechanisms that may be used to make performance measurements, which may yield disparate measurements and exhibit different levels of accuracy. Several such mechanisms include management plane statistical methods, management plane managed object methods, and data path OAM frame methods.

The management plane statistical method uses OAM frames to estimate data path behavior. Such methods are the least accurate since they apply approximations to emulate data frames. The limitation lies in the fact that the behavior of actual data frames may be quite different due to different addressing, processing, transient congestion conditions etc. Also, error conditions in the networks typically happen in bursts, which are more likely to be underrepresented in a statistical model. Thus, the statistical methods are likely to represent different results not representative of actual traffic conditions, although statistical methods may be useful in particular contexts and the invention does not exclude the use of this measurement technique.

The management plane managed objects method uses OAM frames, which use data path managed objects to calculate performance parameters that are inserted and/or extracted via the management plane. These methods are fairly accurate since they use data path statistics to measure data path performance. Their limitation lies in the fact that since the insertion and extraction of these OAM frames is done via the management plane, in-flight frames need to be accounted for. On the egress side, in-flight frames refer to data frames sent in the time period between accessing the egress data path managed objects and actual transmission of an OAM frame relating to those objects. On the ingress side of an OAM frame, in-flight frames refer to data frames received between reception of an OAM frame and a subsequent access of the ingress data plane managed objects. However, this limitation can be addressed by averaging such measurements across multiple time intervals.

The data path OAM frames method uses OAM frames that use data path managed objects that are inserted and/or extracted via the data plane. This method tends to be the most accurate since it does not have the limitations associated with the in-flight frames described above with respect to the management plane managed objects technique. However, the current data path hardware/chips do not support the implementation of such methods, since this requires Ethernet data path processing to include automatic insertion and/or extraction of OAM frames with data plane managed object values. Moreover, it would also require changes in hardware/chips to allow ingress and egress filtering rules across OAM frames to protect service provider administrative domains from unintended OAM frames.

According to an embodiment of the invention, a measurement mechanism based on the use of management plane managed objects mechanism is used to measure network performance. One advantage of these mechanisms is that they require no changes in the existing hardware/chips of the installed base of network elements that ultimately will need to support the Ethernet OAM mechanisms described herein. Rather, such mechanisms only require changes to be made in the OAM client software to enable the Ethernet OAM performance measurement to be implemented. The invention is not limited to this embodiment, however, as one or more of the other described methods may be used as well.

In this method, measurement of a particular parameter may be accomplished via the collection of managed object information and calculation of performance parameter(s) from the collected managed object information. Each of these portions of the method will be described in greater detail below.

Performance Management Collection Method

Managed object information may be collected using general or specific methods. When a general method is used, it can be applied to collect information across different managed objects e.g. using type length values as information elements instead of specific information elements. However, when a specific method with specific information elements is used, a separate method is needed per managed object or per set of managed objects.

Similarly, it is possible to use either a solicited or an unsolicited collection method, in which a solicited method requires a response after an OAM request frame is sent, while an unsolicited method does not require a response to an OAM frame. Some current examples of solicited and unsolicited methods include loopback and continuity check, as described in greater detail herein, although the invention is not limited to these two examples.

A generic method similar to the variable request/response method used in IEEE 802.3ah may be used to send/receive data path managed object information. Further, according to an embodiment of the invention, both solicited and unsolicited methods may be used and optionally extended, as discussed in greater detail below. Note that this extension for performance management will require additional processing and therefore should not be used for the measurement of delay.

Frame Loss Measurement

Several maintenance entities may be defined to support Frame Loss (FL) measurements, including: service management entities for point-to-point service with dedicated UNIs; UNI_C to UNI_C; UNI_N to UNI_N; access link (UNI); inter-domain (NNI); network maintenance entities; intra-domain; inter-domain; and numerous other types of maintenance entities. The invention is not limited to the particular maintenance entities used to perform frame loss measurements.

Unsolicited Method

To calculate frame loss using an unsolicited method, when applied across a UNI_N to UNI_N management entity, an OAM frame is sent every N seconds (e.g. N=1) that includes an indication of the number of frames transmitted at the ingress service UNI. Upon receiving this OAM frame, the transmitted value is compared with a frames received value at the egress service UNI. Between two such consecutive OAM frames, the frame loss can be measured as Frame Loss (FL)=|CT2−CT1|−|CR2−CR1|, where CT and CR are the number of transmitted and received frame counts, and the absolute value indicators apply where the counters wrap. The invention is not limited to the use of this particular formula, however, as other manners of measuring the frame loss may be used as well. Consecutive messages help in reducing error introduced by in-flight frames and any lack of timing synchronization between sender and receiver. Within a measurement time interval, the frame loss count can be averaged to improve the accuracy of this measurement.

Solicited Method

To calculate frame loss using a solicited method, the requestor sends an OAM request frame to a receiver every N seconds (e.g. N=1) with its managed objects information and expects an OAM response frame with receiver's managed object information. For example, when applied across an UNI_C to UNI_C maintenance entity, the requestor sends a frames transmitted value at an egress service UNI and requests a frames received value from the receiver's ingress service UNI. Similarly, when applied across an UNI_N to UNI_N maintenance entity, the requestor sends a frames received value at an ingress service UNI_N and requests the frames transmitted value from receiver's egress service UNI_N.

Upon receiving the OAM request frame, the receiver compares the received managed object information with its corresponding managed object information, and sends a response OAM frame back to the requestor with the requested managed object information. When applied across an UNI_C to UNI_C maintenance entity, the receiver compares the received frames transmitted value with the frames received value and responds with its frames transmitted value. Similarly, when applied across an UNI_N to UNI_N maintenance entity, the receiver compares the received frames received value with its frames transmitted value and responds with its frames transmitted value.

Upon receiving an OAM response frame, the requestor compares the original sent value with the received values, in a manner similar to the receiver. It is possible that the receiver returns the results of frame loss instead of the managed object information in the response. However, if the managed object information is returned, the performance collection method remains generic.

Between two such consecutive OAM frames, the frame loss can be measured as Frame Loss=|CT2−CT1|−|CR2−CR1|, where CT and CR are the frames transmitted and frames received counts, and the absolute value indicators apply where the counters wrap. The invention is not limited to the use of this particular formula, however, as other manners of measuring the frame loss may be used as well. Consecutive messages help in reducing error introduced by in-flight frames and lack of timing synchronization between the sender and the receiver. Within a measurement time interval, the frame loss count can be averaged to improve the accuracy of this measurement.

Information elements that can be applied to the OAM data mentioned herein include the sequence number, the number of transmit TLVs (value filled in by requestor, recipient simply copies it back in response), the number of request TLVs (value is filled in by recipient and sent back in response), and the TLVs (Managed Object variable: FramesTransmitted OK & FramesReceivedOK, value length, value). The above method can be applied for measuring network level frame loss. The network level frame loss can be measured within the network, independent of the services.

For non-dedicated point-to-point service types with multiplexed service UNI, where a UNI carries more than one service flow, it is possible to measure the frame loss when the data path managed objects per service instance are supported.

Statistical Method

For a multipoint-to-multipoint service type, the statistical method across a pair of UNIs can be applied to estimate frame loss. For example, the requestor may send a number (N) of OAM request frames to a recipient and may receive a different number (M) response frames back from the recipient such that M<=N. The data path frame loss can be estimated as Frame Loss=(N−M) per measurement time interval. As noted earlier, statistical methods are less accurate than the solicited and unsolicited methods, but the invention is not limited to use of one of the solicited or unsolicited methods described above.

Frame Delay Measurement

Frame Delay (FD) measurement may be performed for point-to-point and multipoint-to-multipoint between a given pair of UNIs. Service maintenance entities across which frame delay can be measured include UNI_C to UNI_C and UNI_N to UNI_N. Frame delay measurements may be performed using a solicited method such as loopback, an unsolicited method such as connectivity check, or another method.

The loopback method measures round-trip or two-way frame delay. In this method, the requestor sends an OAM request message with its timestamp to the receiver. The receiver replies, copying the requestor's timestamp. At the requestor, the difference between the timestamps at the time of receiving the OAM response frame and original timestamp in the OAM response frame results in round trip frame delay. The frame delay method may support several information elements, including sequence number and request timestamp. The invention is not limited to use of either of these OAM data fields.

Frame Delay Variation Measurement

The Frame Delay Variation may be measured for point-to-point and multipoint-to-multipoint flows between a given pair of UNIs. The maintenance entities across which the frame delay variation can be measured include UNI_C to UNI_C and UNI_N to UNI_N. A solicited method, such as a loopback method, may be used. The loopback method measures the round-trip or two-way frame delay per request and response frame. Within the period of observation, the requestor keeps track of maximum frame delay ($FD_{max}$) and minimum frame delay ($FD_{min}$). The frame delay variation is then calculated as: Frame Delay Variation or jitter=$FD_{max}$–$FD_{min}$. Information elements that may be used in connection with the frame delay variation include the sequence number and the request timestamp, although other elements may be included as well.

Additionally, one-way Frame Delay Variation (FDM) may be measured, for example at the receiver the frame delay variation may be measured as FDV=[Time(rx2)–Time(rx1)]–[Time(tx2)–Time(tx1)], to provide the one-way delay variation between the two samples. This does not require time synchronization between requestor and responder. The invention is not limited to this particular example as other measurements may be made as well.

Availability Measurement

Availability measurements may be performed for point-to-point services with at least dedicated UNIs. Service maintenance entities across which availability may be measured include UNI_C to UNI_C and UNI_N to UNI_N. Availability may be measured using one or more of the frame loss, frame delay, or frame delay variation methods described above. In the embodiment described in Mohan, the availability time period may be different than the measurement time period, the availability time interval (e.g. 24 hr) can be divided into measurement time intervals (e.g. 1 minute). In one embodiment, Frame Loss (FL), Frame Delay (FD), and Frame Delay Variation (FDV) measurements are measured per measurement time interval. A Frame Loss Ratio (FLR) is calculated as the total lost frames/total transmitted frames for the interval. One or more performance parameters e.g. FLR, FD, FDV may contribute towards Availability measurements, and the present invention is not limited to any particular combination of the one or more performance parameters for availability measurement purposes.

According one aspect of the present invention, in an attempt to facilitate consistency of service management and operations between carriers that use the Ethernet OAM and carriers using other transport technologies, the FLR, FD and FDV measurement time interval is reduced to one second, and the one second FLR, FD, and FDV metrics are used to calculate additional availability metrics, similar to those in the G.826 and G.827 ITU standards, as described below, and as outlined in the flow diagram of FIG. 11.

Figure 11:
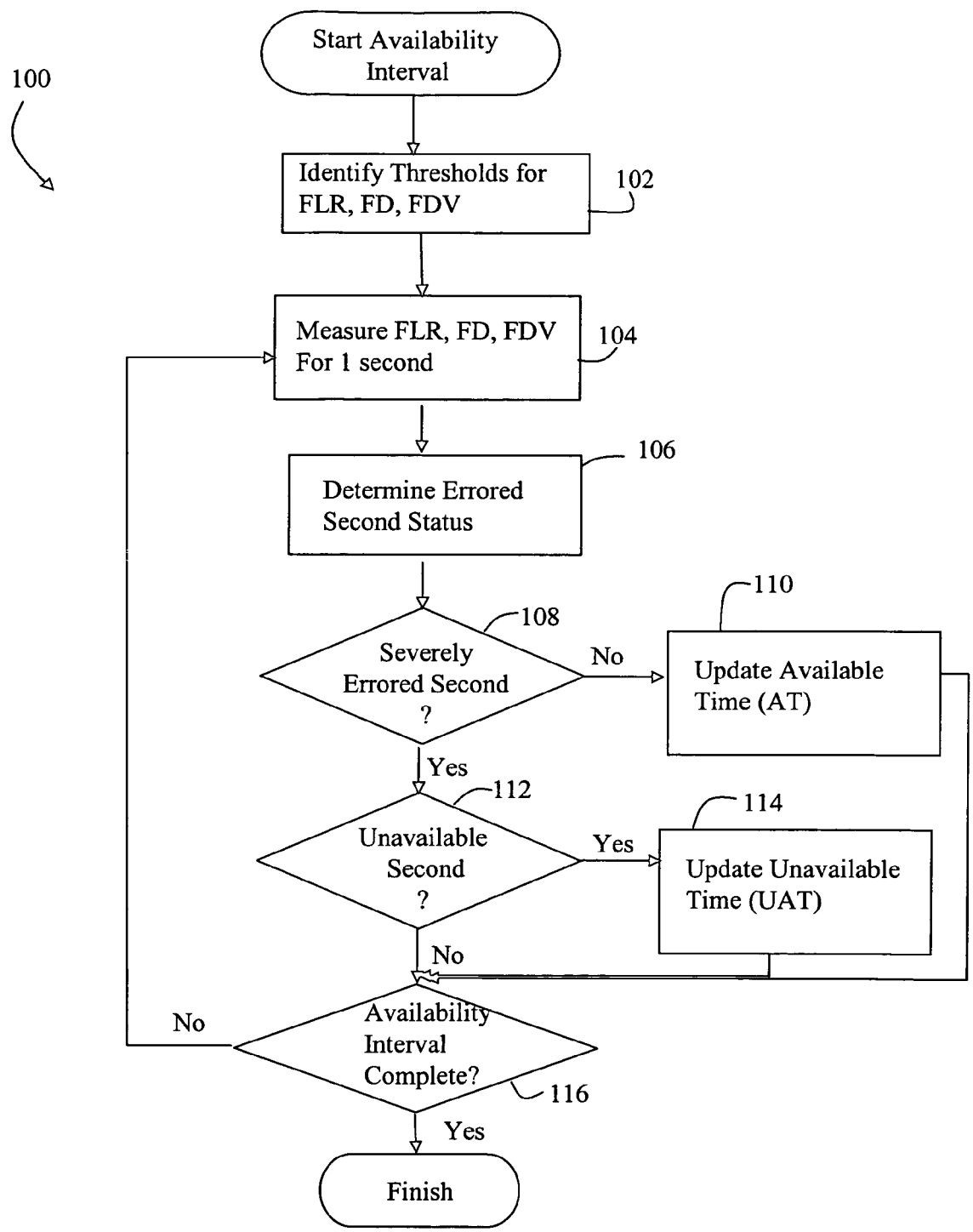
FIG. 11 is a flow diagram illustrating several exemplary steps that may be performed to collect availability metrics according to one aspect of the invention.

FIG. 11 illustrates several steps that may be performed in a process 100 of collecting availability metrics over an availability interval. The availability interval may be any period of time selected by a network administrator. At step 102, the thresholds for each of the FLR, FD and FDV are retrieved. The thresholds associated with the different frame metrics may be selected according to a desired service level associated with the maintenance entity. The following thresholds are retrieved:

Threshold for FLR to determine Errored Seconds ($FLR_{TES}$)
Threshold for FLR to determine Severely Errored Seconds ($FLR_{TSES}$)
Threshold for FD to determine Errored Seconds ($FD_{TES}$)
Threshold for FD to determine Severely Errored Seconds ($FD_{TSES}$)
Threshold for FDV to determine Errored Seconds ($FDV_{TES}$)
Threshold for FDV to determine Severely Errored Seconds ($FDV_{TSES}$)

At step 104, the FLR, FD and FDV are measured for a maintenance entity of interest during a one second transmission interval. At step 106, it is determined whether or not the collected data for the second indicates an error in transmission for the second (i.e., an Errored Second). Equation I identifies the conditions that may cause a transmission second to be considered an Errored Second: Again, it should be noted that one, more or all three parameters i.e. FLR, FD, and FDV can be measured during the 1 second transmission interval. The choice between one, or more parameters that contribute to the Availability is based on policy or SLA requirements and the present invention is not limited to any particular choice of parameters for Availability measurement.

$$(FLR_{TSES} > FLR > FLR_{TES}) \text{ OR } (FD_{TSES} > FD > FD_{TES})$$
$$\text{OR } (FDV_{TSES} > FDV > FDV_{TES}) \text{ OR } (dLOC) \qquad \text{Equation I}$$

Where dLOC is a loss of connectivity defect identified when three consecutive Continuity Check (CC) frames are lost from a peer maintenance end point. Thus, if any of the values exceed their Errored Second threshold, but is still less than the Severely Errored Second threshold, it is an Errored Second. In FIG. 11, at step 106 the ED, FLR and FDV performance metrics are evaluated as in Equation I for the second to determine if it is an Errored Second.

The process proceeds to step 108, where it is determined whether or not the second is a Severely Errored Second. Equation II identifies the conditions that may cause a transmission second to be considered a Severely Errored Second:

$$(FLR > FLR_{TSES}) \text{ OR } (FD > FD_{TSES}) \text{ OR}$$
$$(FDV > FDV_{TSES}) \text{ OR } (dLOC) \qquad \text{Equation II}$$

In FIG. 11, at step 108, it is determined whether the second is a Severely Errored Second by applying the above formula. If it is determined that it is NOT a Severely Errored Second, an Available Time (AT) metric is updated at step 110. The AT metric indicates the period of time that the connection has been available during the availability measurement interval. The AT starts at the onset of some number (for example 10) consecutive non-SESs, and includes the number of consecutive non-SES seconds in its count. The present invention is not limited to any particular number for non-SES seconds.

If the execution of Equation II for a second indicates, at step 108, that it is a Severely Errored Second, the process proceeds to step 112, where it is determined whether the second should be classified as an Unavailable Second (UAS). A second is declared to be an UAS when the previous second was an UAS or the past N seconds were consecutively SES, where X may be any number, for example 10. A second is determined to not be a UAS when, for that second, either the previous second was NOT a UAS, none of the N previously consecutive seconds were SES.

If it is determined at step 112 that the second is an UAS, then at step 114 an Unavailable Time (UAT) is updated. The UAT reflects the amount of time the maintenance entity/connection was unavailable during the availability measurement interval. The UAT starts upon the first UAS, and includes the N consecutive seconds of SES which mark the beginning of the UAS.

Following the update of the AT, UAT, or the determination that a second was not a UAS, the process proceeds to step 116, whether it is determined whether the availability measurement interval is complete. If so, the process 100 is finished collecting availability metrics. If not, the process returns to step 104, where the next second of FLR, FD and FDV metrics are collected.

Once the initial metrics have been collected, other Availability metrics, similar to those specified by G.826 and G.827 can readily be obtained. For example, an Errored Second Ratio (ESR) can be calculated by taking the ratio of ES to AT for the availability measurement period. Similarly, a Severely Errored Second Ratio (SESR) can be obtained by taking the ratio of SES to AT for the availability measurement period. An Availability Ratio (AR) is determined by taking the ration of AT to the total availability measurement period, while an Unavailability Ratio (UAR) is obtained by taking a ration of UAT to total availability measurement period. An Outage Intensity (OI) value can be obtained by counting the number of periods of UAT during the availability measurement period.

Figure 12:
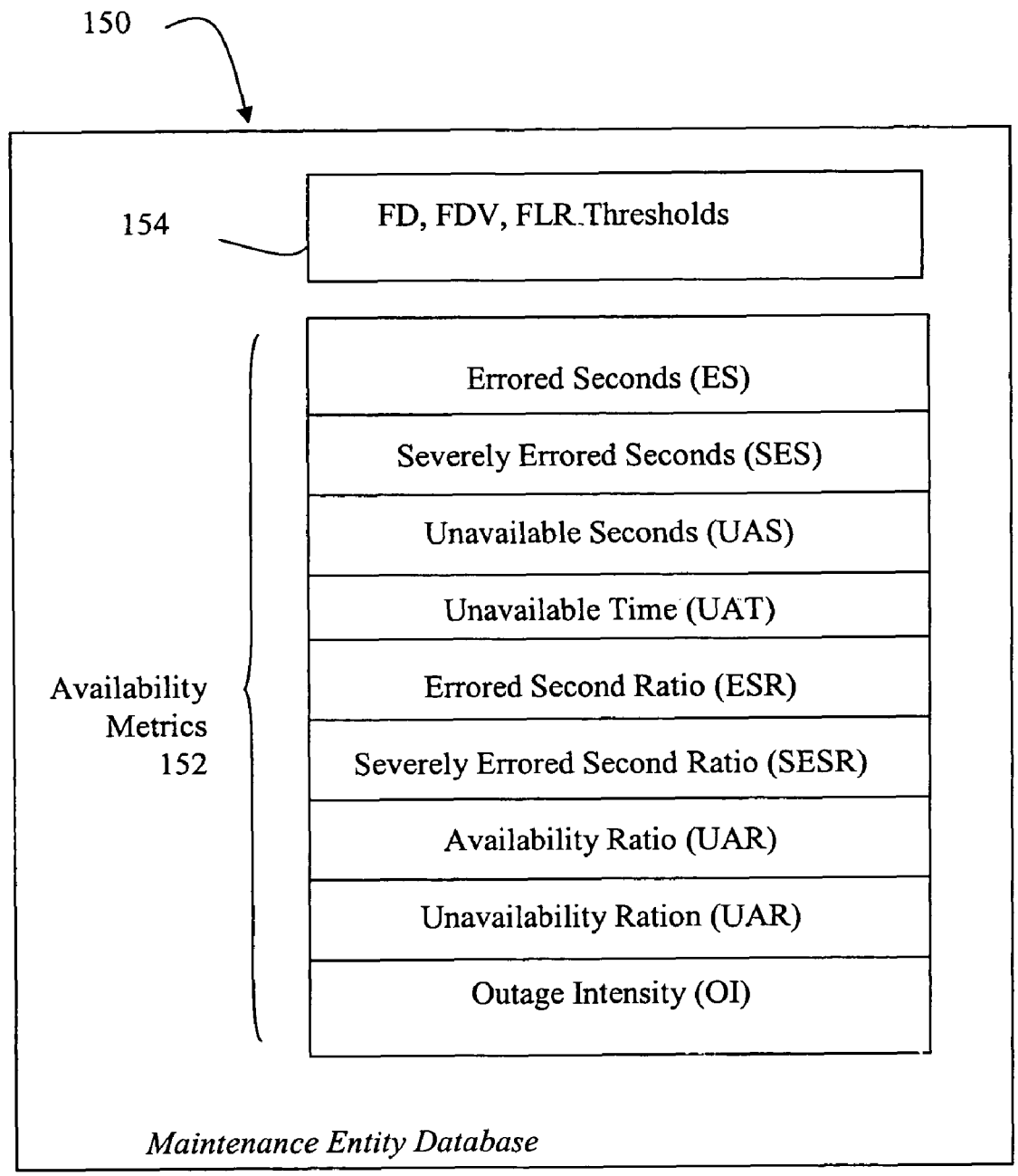
FIG. 12 is a diagram illustrating the storage of availability metric information with a maintenance entity object.

Referring briefly to FIG. 12, a maintenance entity object 150 is shown to include availability metrics stored therewith. The availability metrics can include all or only some of the metrics that are illustrated in FIG. 12, and the present invention is not limited to the inclusion of any specific metrics as part of the maintenance entity object 150. The availability metrics can be advantageously used to ensure that the connection associated with the maintenance entity meets desired service level expectations. In the embodiment of FIG. 12, the FD, FDV and FLR thresholds 154 are also shown as stored with the maintenance entity object, to represent that different maintenance entities, or connections, have different service levels and thus different thresholds associated therewith. It can be appreciated that it is not a requirement that the threshold levels are stored with the object, provided there is an association between the service level associated with the connection and threshold values used to determine the availability metrics.

Accordingly a method an apparatus has been shown and described which allows availability metrics similar to those outlined in G.826 and G.827 to be collected and used for performance management in an Ethernet OAM network. The aspects of Ethernet OAM may be implemented in a number of different manners, including as software centrally instantiated in one or more management systems or as distributed code instantiated in the various network elements configured to implement the OAM functions. It should be understood that all functional statements made herein describing the functions to be performed by the methods of the invention may be performed by software programs implemented utilizing subroutines and other programming techniques known to those of ordinary skill in the art. Alternatively, the aspects of Ethernet OAM may be implemented in hardware, firmware, or a combination of hardware, software, and firmware. The invention is thus not limited to a particular implementation.

When the OAM functions are implemented in software, the software may be implemented as a set of program instructions configured to operate in control logic on a network element that are stored in a computer readable memory within the network element and executed on a microprocessor. For example, in the network element of FIG. 2, the OAM functions may be performed by OAM module 46 implemented as software and executed on a processor associated with the interface manager 40. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of monitoring availability in an Ethernet network, the method comprising the steps of:
    associating performance thresholds with a maintenance entity defined between flow points on the Ethernet network;
    measuring performance parameters of the maintenance entity for a time interval, the performance parameters including frame metrics; and
    comparing one or more of the measured performance parameters to the performance thresholds to determine an availability metric of the maintenance entity.

2. The method of claim 1, wherein the frame metrics are selected from a group including Frame Loss Ratio (FLR), Frame Delay (FD) and Frame Delay Variation (FDV).

3. The method of claim 2, wherein the performance thresholds are selected from a group including an Errored Second Threshold, a Severely Errored Second Threshold and an Unavailability Threshold.

4. The method of claim 3, wherein the availability metric is an Errored Second, wherein the time interval is a second, and wherein the method includes the step of determining that the second is an Errored Second if any one of the measured FLR, FD and FDV frame metrics exceed their associated Errored Second Threshold.

5. The method of claim 4, wherein the step of determining whether the second is an Errored Second includes the step of determining that at least one the measured FLR, FD and FDV frame metrics that exceeds its associated Errored Second Threshold is also less than its associated Severely Errored Second Threshold.

6. The method of claim 3, wherein the availability metric is a Severely Errored Second, wherein the time interval is a second, and wherein the second is a Severely Errored Second if any one of the measured FLR, FD and FDV frame metrics exceed their associated Severely Errored Second Threshold.

7. The method of claim 6, including the step of determining that the second is an Unavailable Second responsive to either the previous second being an unavailable second or a N previous consecutive seconds being Severely Errored Seconds.

8. The method according to claim 7 including the step of updating an Unavailability Time (UAT) metric in response to the detection of an Unavailable Second.

9. The method according to claim 6, further including the step of updating an Available Time (AT) metric in response to N consecutive determinations that a second is not a Severely Errored Second.

10. The method according to claim 4, wherein an availability measurement interval includes a plurality of the time intervals, and further including the step of determining, for each availability measurement interval, an Errored Second Ratio (ESR) representing a number of Errored Seconds in the availability measurement interval.

11. The method according to claim 6, wherein an availability measurement interval includes a plurality of the time intervals, and further including the step of determining, for each availability measurement interval, a Severely Errored Second Ratio (SESR) representing a number of Severely Errored Seconds in the availability measurement interval.

12. The method according to claim 8, wherein an availability measurement interval includes a plurality of the time intervals, and further including the step of determining, for each availability measurement interval, an Unavailability Ratio (UAR) representing a ratio of UAT to the availability measurement interval.

13. The method according to claim 9, wherein an availability measurement interval includes a plurality of the time intervals, and further including the step of determining, for each availability measurement interval, an Availability Ratio (AR) representing a ratio of AT to the availability measurement interval.

14. The method according to claim 8, wherein an availability measurement interval includes a plurality of the time intervals, and further including the step of determining an Outage Intensity (OI) metric reflecting a number of periods of UAT during the availability measurement interval.

15. A network device comprising: a processor, operations and maintenance (OAM) program code stored on a computer readable medium, the OAM program code operable when executed by the processor to collect availability metrics in an Ethernet network by: associating performance thresholds with a maintenance entity defined between flow points on the Ethernet network, measuring performance parameters of the maintenance entity for a time interval the performance parameters including frame metrics; and comparing one or more of the measured performance parameters to the performance thresholds to determine an availability metric of the maintenance entity.

16. The network device of claim 15, wherein the frame metrics are selected from a group including Frame Loss Ratio (FLR), Frame Delay (FD) and Frame Delay Variation (FDV).

17. A network device comprising: a processor, operations and maintenance (OAM) program code stored on a computer readable medium, the OAM program code operable when executed by the processor to collect availability metrics in an Ethernet network by: associating performance thresholds with a maintenance entity defined between flow points on the Ethernet network; the performance thresholds are being selected from a group including an Errored Second Threshold, a Severely Errored Second Threshold and an Unavailability Threshold; measuring performance parameters of the maintenance entity for a time interval; and comparing one or more of the measured performance parameters to the performance thresholds to determine an availability metric of the maintenance entity.

18. The network device of claim 16, wherein the OAM program code is further operable, when executed, to calculate at least one of an Unavailable Time (UAT), Available Time (AT), Errored Second Ratio (ESR), Severely Errored Second Ratio (SESR), Unavailability Ratio (UAR), Availability Ratio (AR) and Outage Intensity (OI) responsive to the FLR, FD, FDV and performance thresholds.

* * * * *

UNITED STATES PATENT AND TRADEMARK OFFICE
CERTIFICATE OF CORRECTION

| | | |
|---|---|---|
| PATENT NO. | : 8,045,475 B2 | Page 1 of 1 |
| APPLICATION NO. | : 11/304019 | |
| DATED | : October 25, 2011 | |
| INVENTOR(S) | : Dinesh Mohan | |

It is certified that error appears in the above-identified patent and that said Letters Patent is hereby corrected as shown below:

On the first page, column 2, under "U.S. Patent Documents", line 4, replace:

"Davis et al." with --Goldsack et al.--.

Signed and Sealed this

Thirteenth Day of December, 2011

David J. Kappos
*Director of the United States Patent and Trademark Office*